Patented Nov. 21, 1939

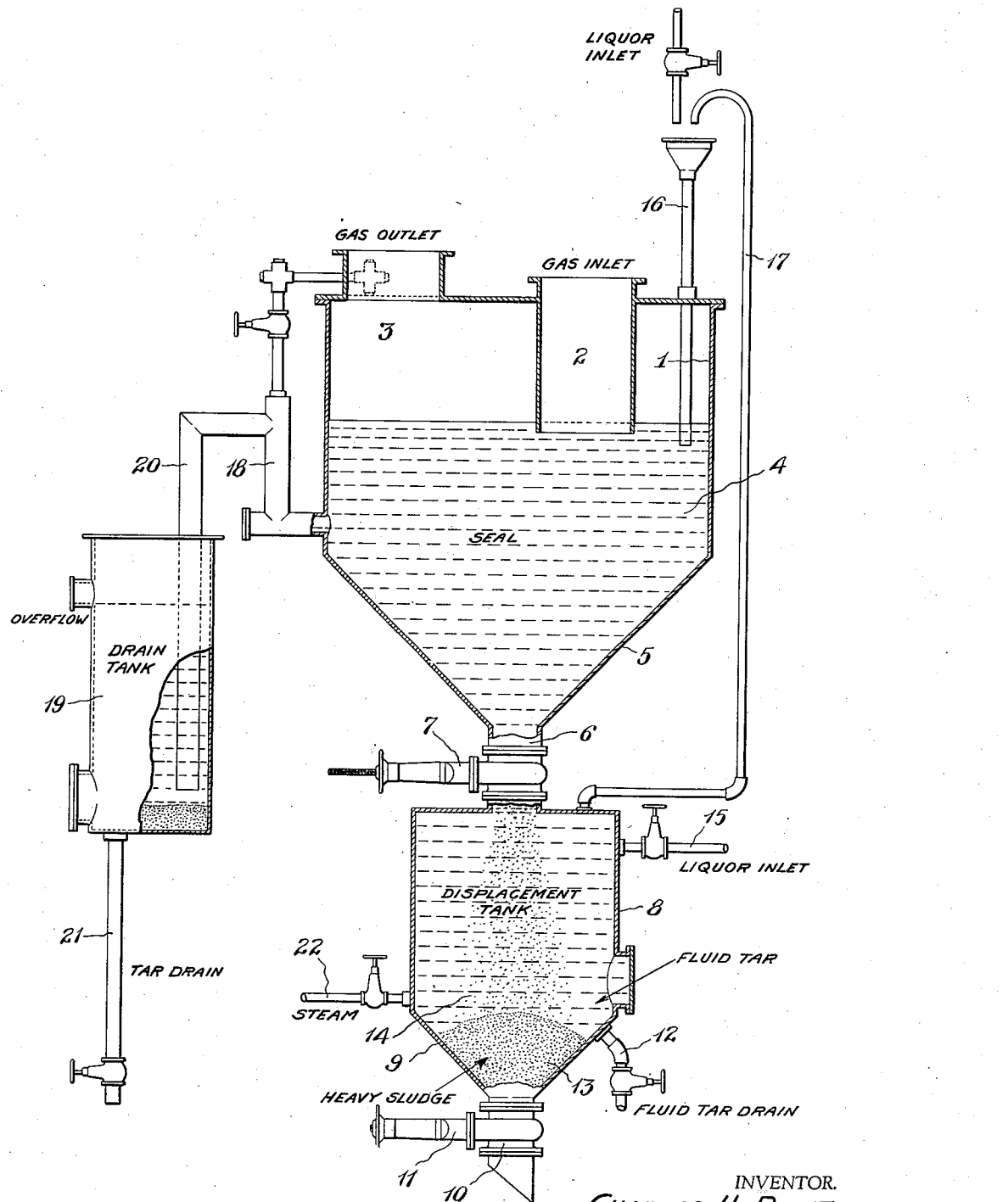

2,180,849

UNITED STATES PATENT OFFICE 2,180,849

METHOD OF REMOVING LIQUID TAR AND SLUDGE FROM WATER GAS WITH THE NONFORMATION OF TAR EMULSION

Charles H. Printz, Cleveland, Ohio, assignor to The Gas Machinery Company, Cleveland, Ohio, a corporation of Ohio Application October 23, 1937, Serial No. 170,618

3 Claims. (Cl. 261—7)

My invention relates to improvements in processes of removing the liquid tar and sludge from water gas without interrupting the gas-making operation or the input of the made-gas into the seal separator. Particularly, the invention relates to improved methods of removing the liquid tar and sludge from water gas, with the non-formation of tar emulsion. As is well known, the removal of the liquid tar and sludge carried with the made-gas out of the gas-making apparatus is ordinarily effected in a so-called seal separator, usually a plain box or casing containing suitable separating liquor beneath the surface of which the made-gas issuing from the gas set is conducted, the gas passing through the separating liquor and thence out from the seal casing and being conducted into storage, or to point of consumption, or any other suitable and desired place. The liquid tar and sludge, which are in a vaporous condition, are separated from the made-gas upon contact of the latter with the separating liquor. The separating liquor is agitated by the bubbling gas and this agitation results in the formation of tar emulsion, if the separated tar and sludge are not promptly removed from the sphere of the agitated liquor. My improved process provides a method of removing the separated liquid tar and sludge from the separator without interrupting the gas-making operation or the input of the made-gas into the seal separator. The primary advantage of the improved method is the non-formation of tar emulsions, as hereinafter fully explained.

In a pending application, Serial No. 138,865, I have disclosed improvements in seal-separators, which I have termed Means for separating fluid-tar and sludge from hot newly made water gas, and such application discloses mechanical features of the general invention in processes of removing the liquid tar and sludge from water gas which I have devised and of which the instant application discloses the improved methods of removing the liquid tar and sludge.

Standard seal casings usually have flat bottoms, and the fluid tar and heavy sludge carried into the seal separator by the made-gas and which are separated from the latter settle by gravity and collect upon the flat bottoms. When heavy oil is used for enrichment of the gas made in the gas-making set, or even when gas oil is used for such enrichment together with bituminous coal in the generator of the set, great difficulty is encountered in the use of the known forms of seals because of the formation of tar and liquor emulsion in the seal. This emulsion results because of the continued presence of the tar in the separating liquor which is being agitated by the gas bubbling therethrough. The formation of tar emulsion is a vexing and expensive result, since the tar must be de-emulsified before it is marketable, and this de-emulsification involves considerable additional equipment and expense. My improved method transfers the separated liquor tar and sludge to a quiescent portion of the separating liquor body, removed from the gas-agitated portion thereof, and thus prevents the formation of tar emulsions. Also, the improved method removes the separated and settled liquor tar and sludge from the seal casing without interrupting the gas-making operation and the continuous input of the made-gas into the agitated portion of the separating liquor. Furthermore, my improved method results in a minimum of water content in the removed tar, even as low as five (5) per cent, which obviates subsequent dehydration of the tar. If the tar is to be used as fuel, it must be dehydrated, if the water content is above ten (10) per cent.

The annexed drawing and the following description set forth in detail certain means in which, and certain series of steps by which, my improved method may be worked, such steps constituting, however, only a few of the various series of steps by which the improved method may be worked.

The drawing is a vertical longitudinal section, partially in elevation, of one form of apparatus in which my improved method may be worked.

Referring to the annexed drawing, a casing 1 is provided with an upper gas inlet 2 and a gas outlet 3 and, in use, is filled with hot liquid 4 to a level above the bottom of the inlet 2, to form a seal in which fluid tar and heavy sludge are separated from the gas as the latter bubbles through the liquor 4 from the inlet 2 to the outlet 3. In the form of casing 1 shown, I provide a hopper-shaped bottom 5 therefor. The fluid tar and heavy sludge are separated from the gas as the latter bubbles through the seal liquor and settle toward the bottom of the casing 1, the heavy sludge sliding on the hopper bottom 5 toward a bottom outlet 6 therefrom. This bottom outlet 6 is a throatlike member controlled by a valve 7 and opens into the top of an auxiliary casing 8 which also has a hopper-shaped bottom 9 and a bottom discharge spout 10 therefrom controlled by a valve 11. Adjacent the top of the hopper bottom 9 is a drain pipe 12. The casing 8 functions as a displacement tank for the fluid tar and heavy sludge which settle thereinto through the throat-like pipe 6 and collect upon the bottom of the tank 8, the heavy sludge 13 collecting at the extreme bottom and the fluid tar 14 forming a layer thereabove. The displacement tank 8 forms a quiescent chamber in which there is no emulsifying of the tar and liquor. The fluid tar is removed through the pipe 12 and the heavy sludge is removed through the discharge nozzle 10. The tar is available for the market, in the condition in which it is removed from the tank 8, without the necessity of deemulsification or dehydration. It will be observed that the displacement tank 8 is also full of hot liquor 4, being originally filled at the same time as the casing 1. The casing 1 and the auxiliary casing 8 are, in effect, parts of a single casing, communication between which is controlled by the valve 7. The lower hopper part 5 of the casing 1 also provides to a degree a quiescent area in the separating liquor 4, the casing 8 providing an almost entirely quiescent area in the separating liquor 4. Hot liquor is fed into the tank 1 through the funnel 16 which dips into the liquor 4, during operation, and liquor is made available for refilling the displacement tank 8, for the purpose hereinafter explained, through a controlled liquor inlet 15, the top of the tank 8 being connected with the funnel 16 by a pipe 17, the spilling of the liquor from the pipe 17 into the funnel 16 indicating when the tank 8 is full. A controlled steam connection 22 to the displacement tank 8 permits heating of the liquor in the tank 8 as desired.

The normal output from the seal proper 1 is indicated by the number 18 and it is connected with the normal drain tank 19 by a pipe connection 20, a pipe connection 21 tapping the bottom of the drain tank 19 and serving as a tar drain from the tank 19.

During the operation of the water gas set, the contact of the hot made-gas with the liquor 4 in the seal casing 1 effects the separation from the gas of the light and heavy tar, which settle downwardly through the liquor in the casing 1 into the throat-like member 6 and collect in the quiescent displacement tank 8. During this operation, valve 7 is open, and discharge spouts 10 and 12 and pipe 15 are closed. This settling of the heavy tar or sludge out of the portion of the separating liquor 4 which is agitated by the bubbling gas is quickly effected and the sludge finds its way quickly by gravity down the hopper-shaped bottom 5 of the casing 1 and through the throat-like member 6 to the bottom of the casing 8. Therefore, there is substantially no tar emulsion formed. The fluid tar also quickly settles through the liquor 4 in the casing 1 and the casing 8 and forms a layer in the casing 8 immediately above the deposit of heavy sludge. When it is desired to remove the fluid tar and heavy sludge from the tank 8, it is not necessary to discontinue the gas-making operation, nor the input of the made-gas into the seal 1, but the valve 7 is closed and pipe 12 is first opened to drain off the fluid tar. After this drainage is effected, valve 11 is opened and the heavy sludge is removed through spout 10. Then, to refill the tank 8, outlets 10 and 12 are closed, and inlet 15 is opened and hot liquor fed into the tank 8 until it spills over into the funnel 16 from the pipe 17. Then valve 7 is opened and the process is repeated. Drainage of the fluid tar and heavy sludge from the tank 8 is effected at such suitable intervals as will obviate the collection of so much heavy sludge as would cover the inlet to the fluid-tar drain 12. The hopper bottom portion 5 of the seal casing proper 1 is removed from the greatly-agitated portion of the separating liquor and thus provides a fairly quiescent area so that there is no material amount of tar emulsion formed therein even during the time that the valve 7 is closed and the sludge and fluid tar deposits are being removed from the displacement tank 8.

The use of the improved method which has been described permits separation of liquid tar and sludge from the made-gas, and the removal of the same from the separating apparatus, while permitting continuous operation of the gas-making apparatus, and input of the hot made-gas into the seal 1, and provides entire freedom from tar and liquor emulsion troubles, even when heavy oil is used in the gas-making set for gas enrichment purposes, or when gas oil is utilized for gas enrichment together with bituminous coal in the generator. Furthermore, the separated tar obtained by the use of my improved method contains so small a percentage of moisture that dehydration of the tar is not required. Furthermore, much of even the small moisture content is separable by gravity, if the tar is temporarily stored in tar wells.

What I claim is:

1. A method of removing liquid tar and sludge from water gas, as segregated products, with the non-formation of tar emulsions, consisting in providing a body of wash water in two relatively vertical communicating portions; continuously passing the made-gas from the gas set into the upper part of the upper portion of wash water, with an agitation of said upper part of said upper portion of wash water due to the bubbling gas and with a separation of the liquid tar and sludge from the gas by contact of the latter with the wash water, the remainder of said upper portion of the body of wash water being unagitated to any material extent and the lower portion of the body of wash water being entirely quiescent, the separated liquid tar and sludge settling immediately through the unagitated part of the upper portion of the body of wash water and into the lower quiescent portion and finding their respective levels in said quiescent lower portion; closing communication between said two portions of the body of wash water; removing the settled and segregated liquid tar and sludge from the quiescent area; replenishing with wash water said quiescent area after the removal of the liquid tar and sludge; reestablishing communication between said two portions of wash water, thus periodically effecting the removal of the segregated liquid tar and sludge without interrupting the passing of the made-gas into the wash water; and maintaining the level of the latter.

2. A method of removing liquid tar and sludge from water gas, as segregated products, comprising passing made-gas from a gas set into the upper part only of a body of wash water so that only said upper part of the wash water is agitated by the gas bubbling therethrough and the lower part of the wash water remains substantially unagitated, whereby liquid tar and sludge are separated from the gas by contact of the latter with said upper part of the wash water, settle immediately through the lower unagitated part of the wash water, and find their respective levels in a quiescent area at the lowermost part of the wash water; closing communication between said quiescent area and the wash water thereabove; removing the settled and segregated liquid tar and sludge from said quiescent area; replacing the material removed from the quiescent area by liquid; reopening communication between said quiescent area and the wash water thereabove, thus periodically effecting removal of liquid tar and sludge without interrupting the passing of the made-gas into the wash water; and maintaining the level of the latter.

3. A method of removing liquid tar and sludge from water gas, as segregated products, comprising providing a body of wash water in upper and lower communicating parts; passing made-gas from a gas set into said upper part only of the wash water so that only said upper part of the wash water is agitated by the gas bubbling therethrough and the lower part of the wash water remains quiescent, whereby liquid tar and sludge are separated from the gas by contact of the latter with said upper part of the wash water and settle into said quiescent area to find their respective levels therein; closing communication between said quiescent area and said upper part of the wash water; removing the settled liquid tar and sludge from said quiescent area; replacing the material removed from said quiescent area by water; reestablishing communication between said quiescent area and said upper part of the wash water; and maintaining the level of the latter, all whereby removal of liquid tar and sludge is effected without interrupting the passing of made-gas into the wash water.

CHARLES H. PRINTZ.